United States Patent Office 2,803,580
Patented Aug. 20, 1957

2,803,580

PHOSPHORUS DERIVATIVES, PROCESS FOR THEIR PREPARATION AND COMPOSITIONS CONTAINING SAME

Jean Metivier, Arpajon, France, assignor to Societe des Usines Chimiques Rhone-Poulenc, Paris, France, a corporation of France No Drawing. Application March 5, 1956,
Serial No. 569,233

Claims priority, application France March 5, 1955

12 Claims. (Cl. 167—30)

This invention relates to new phosphorus derivatives and to a process for their preparation, and includes industrially useful compositions containing these new compounds.

The compounds of the present invention are phosphorus derivatives of the general formula:

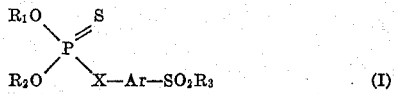
(I)

in which X represents an oxygen or sulphur atom, Ar represents a phenylene group or a phenylene group substituted by one or more halogen atoms or lower alkyl, lower alkoxy or nitro groups, $R_1$ and $R_2$ are the same or are different and each represents a lower alkyl group, and $R_3$ is a saturated or unsaturated aliphatic group containing not more than 4 carbon atoms (for example a hydrocarbon group or a hydrocarbon group which is substituted by one or more hydroxyl groups or halogen atoms) or a phenyl group or a phenyl group substituted by one or more halogen atoms or lower alkyl, lower alkoxy or nitro groups. The group $-SO_2R_3$ may be in the ortho, meta or para position. It should be understood that the terms "lower alkyl group" and "lower alkoxy group" when used in this specification mean respectively alkyl and alkoxy groups containing not more than 4 carbon atoms.

These new compounds may be obtained, according to a feature of the invention, by reacting a phosphorochloridothionate of the general formula:

(II)

with a phenol or thiophenol of the general formula $HX-Ar-SO_2R_3$, in which general formulae X, Ar, $R_1$, $R_2$ and $R_3$ are as hereinbefore defined.

The reaction is preferably affected in an organic solvent medium at a moderate temperature, i. e., a temperature below 150° C., in the presence of an alkaline condensing agent. In a preferred embodiment, the solvent employed is an aliphatic alcohol (preferably methyl or ethyl alcohol), an aliphatic ketone (preferably acetone or methyl ethyl ketone) or a chlorinated hydrocarbon, and the alkaline condensing agent is an alkali metal or one of its derivatives (hydroxide, hydride, amide, carbonate, alcoholate or organo-metallic derivative).

These new phosphorus derivatives have been found to be useful as insecticides and, more especially, as acaricides. They may be utilized in any of the physical forms in which insecticidal materials are customarily used, usually in association with one or more compatible diluents. The present invention accordingly includes within its scope an insecticidal composition containing at least one compound of the general Formula I and at least one diluent compatible therewith. The composition may be provided in solid form by employing a diluent in the form of a powdered compatible solid such as talc, a clay for example kaolin or bentonite, limestone, calcined magnesia, kieselguhr, tricalcium phosphate or cork powder, the phosphorus derivative preferably being present in an amount of from 0.005 to 5% based on the weight of the composition. Instead of a solid, there may be employed a liquid in which the phosphorus derivative is dissolved or dispersed, preferably in an amount of from 0.005 to 0.1% based on the weight of the composition. Thus the composition may be provided in the form of an aerosol or a suspension, emulsion or solution in an organic or aqueous-organic medium, for example an aromatic hydrocarbon such as toluene or xylene, or a mineral or animal or vegetable oil or a mixture of such media. Compositions in the form of dispersions, solutions or emulsions may contain a wetting, dispersing or emulsifying agent of the ionic or non-ionic type, for example sulphoricinoleates, quaternary ammonium derivatives or products based on ethylene oxide condensates such as condensates of ethylene oxide with octylphenol or fatty acid esters of anhydrosorbitols which have been solubilized by etherifying the free hydroxyl groups with ethylene oxide. Agents of the non-ionic type are preferred since they are not affected by electrolytes. When use of emulsions is contemplated, the phosphorus derivatives may be formulated as a self-emulsifying concentrate containing the active substance dissolved in the dispersing agent or in a solvent compatible with that dispersing agent, the compositions being made ready for use by the simple addition of water.

Compositions of solid form are preferably prepared by crushing the phosphorus derivative with the solid diluent, or by impregnating the solid diluent with a solution of the phosphorus derivative in a volatile solvent, driving off the solvent and, if necessary, crushing the product to form a powder.

The new compounds may be employed in admixture with other insecticides including substances resulting in a synergistic effect.

Certain of the new derivatives are found not only to be active against mobile forms of insects but also to have an acaricidal-ovicidal activity. In particular, O.O-diethyl - O - m - chloro - p - methyl- and O.O-dimethyl-O-p-methyl-sulphonylphenylphosphorothionate are found to posses acaricidal-ovicidal activity in high degree, the former being preferred in view of its lower toxicity to man.

The following non-limitative examples illustrate the invention.

Example I

To a suspension of 13.8 g. of potassium carbonate in 200 cc. of methyl ethyl ketone there is added all at once 17.2 g. of p-methylsulphonylphenol (Burdwell and Cooper, J. A. C. S. 74, 1058 (1952)), and then over a period of 10 minutes 18.9 g. of O.O-diethyl phosphorochloridothionate. When the addition is complete, the mixture is agitated for 10 minutes, heated to 50° C. and maintained at that temperature for five hours.

The reaction mixture is then cooled and taken up in 50 cc. of distilled water. The organic layer is separated and dried over potassium carbonate. After filtration, it is concentrated by heating at from 60 to 70° C. under a pressure of from 20 to 30 mm. of mercury. The oily residue obtained is taken up in 100 cc. of benzene, washed once with 25 cc. of a 10% by weight solution of potassium carbonate and then 3 times with 25 cc. of water. After drying over potassium carbonate and filtering, the residue is concentrated by heating at 70 to 80° C. under a pressure of 20 to 30 mm. of mercury and then at 80 to 90° C. under a pressure of 1 mm. of mercury. A yellow oil, weighing 29 g. remains, analysis of which shows that it is O.O-diethyl O-p-methylsulphonylphenylphosphorothionate.

Example II

A suspension of 17.2 g. of p-methylsulphonylphenol and 14 g. of potassium carbonate in 100 cc. of methyl ethyl ketone is heated to 65° C. 16.1 g. of O.O-dimethyl phosphorochloridothionate are added over a period of about five minutes, whereafter the heating at 65° C. is continued for 5 hours.

After cooling of the reaction mixture, the salts formed are removed by filtration. The substantially colourless filtrate is agitated for half an hour with 14 g. of potassium carbonate.

After filtration, the liquid fraction is concentrated under a pressure of 30 mm. of mercury with heating at about 40 to 50° C. A viscous oil weighing 28 g. is obtained, analysis of which shows that it is O.O-dimethyl O-p-methylsulphonylphenylphosphorothionate.

Example III

A mixture prepared from 17.2 g. of p-methylsulphonylphenol, 13.8 g. of potassium carbonate and 250 cc. of methyl ethyl ketone is heated to 65° C. 21.6 g. of O.O-diisopropyl phosphorochloridothionate are added over a period of about five minutes, whereafter the heating at 65° C. is continued for 6 hours.

After cooling of the reaction mixture, the salts formed are removed by filtration. The filtrate is agitated for half an hour with 14 g. of potassium carbonate. After filtration, the solvent is driven off under a pressure of from 20 to 25 mm. of mercury and at a temperature of from 50 to 60° C. The remaining oily residue weighing 37 g. is taken up in 200 cc. of benzene. The resulting solution is washed three times with 35 cc. of water, dried over anhydrous calcium chloride and concentrated at from 70 to 80° C. under a pressure of from 20 to 25 mm. of mercury. A viscous oil weighing 32 g. remains, analysis of which shows that it is O.O-diisopropyl O-p-methylsulphonylphenylphosphorothionate.

Example IV

To a suspension of 20.6 g. of p-chloromethylsulphonylphenol, 13.8 g. of potassium carbonate and 0.5 g. of copper powder in 150 cc. of methyl ethyl ketone are added, over a period of five minutes, about 18.9 g. of O.O-diethyl phosphorochloridothionate, whereafter the mixture is agitated for one hour at room temperature. The reaction mixture is then maintained for five hours at a temperature of from 45 to 50° C. After cooling, the solution is filtered, treated with decolorizing charcoal and concentrated at a temperature of from 50 to 60° C. under a pressure of from 20 to 30 mm. of mercury. A yellow-coloured oil weighing 26 g. is obtained, analysis of which shows that it is O.O.-diethyl O-p-chloromethylsulphonylphenylphosphorothionate.

Example V 16.1 g. of O.O-dimethyl phosphorochloridothionate are added over a period of about five minutes to a suspension of 20.7 g. of p-chloromethylsulphonylphenol, 14 g. of potassium carbonate and 0.5 g. of copper powder in 150 cc. of methyl ethyl ketone. When the addition is complete the mixture is agitated for two hours at room temperature (25° C.) and then heated for one hour at from 45 to 50° C. After cooling and removal, by filtration, of the salts formed, the liquid fraction is concentrated at a temperature of from 40 to 45° C. under a pressure of from 20 to 30 mm. of mercury. An oily residue remains, which crystallizes on cooling (32 g.). This residue is brought into solution in 75 cc. of boiling ethanol. After filtration the solution is allowed to cool. The white crystals thus produced are separated by centrifugation. After drying, there are obtained 28.5 g. of O.O - dimethyl O - p - chloromethylsulphonylphenylphosphorothionate melting at 95° C. (Kofler).

Example VI 21.6 g. of O.O-diisopropyl phosphorochloridothionate are added over a period of about five minutes to a suspension of 20.6 g. of p-chloromethylsulphonylphenol, 13.8 g. of potassium carbonate and 0.5 g. of copper powder in 250 cc. of methyl ethyl ketone. The mixture is agitated for five hours at room temperature. The product is then heated at from 50 to 60° C. for two hours, allowed to cool and the liquid is filtered off. The solvent at a temperature of from 50 to 60° C. is driven off under a pressure of from 20 to 30 mm. of mercury to leave a viscous oil weighing 36.5 g., analysis of which shows that it is O.O-diisopropyl O-p-chloromethylsulphonylphenylphosphorothionate.

The p-chloromethylsulphonylphenol employed as starting material in Examples IV, V and VI is prepared by the method of Barbier, Rumpf and Mutrel: Bull. Soc. Chim. Biol. 34, 1005 (1952) and melts at 111° C.

Example VII

A suspension of 20.7 g. of m-chloro-p-methylsulphonylphenol and 13.8 g. of potassium carbonate in 250 cc. of methyl ethyl ketone is heated to a temperature of from 55 to 60° C. 19 g. of O.O-diethyl phosphorochloridothionate are added over a period of about five minutes, after which the temperature is maintained at about 60° C. for 6 hours. After standing overnight, the salt formed is removed by filtration and the liquid is concentrated at a temperature of from 50 to 60° C. under a pressure of from 20 to 30 mm. of mercury. The residual oil (40 g.) is taken up in 150 cc. of benzene and washed three times with 100 cc. of water. After drying the washed solution over potassium carbonate, the benzene is driven off. There remains an oil weighing 31 g., analysis of which shows that it is O.O-diethyl O-m-chloro-p-methylsulphonylphenylphosphorothionate.

The m-chloro-p-methylsulphonylphenol, which melts at 118° C., is prepared by the action of hydrobromic acid on m-chloro-p-methylsulphonylanisole by analogy with the preparation of p-methylsulphonylphenol by the method of Burdwell and Cooper, J. Am. Chem. Soc. 74, 1058 (1952).

The m-chloro-p-methylsulphonylanisole, which melts at 83° C. (Kofler) is itself prepared by methylation of o-chloro-p-methoxythiophenol and oxidation, by known methods, of the p-methylmercapto-m-chloroanisole which is obtained as an intermediate product. The latter is a liquid boiling at from 116 to 117° C. under a pressure of 2.5 mm. of mercury.

The o-chloro-p-methoxythiophenol which boils at from 85 to 87° C. under a pressure of 0.8 mm. of mercury, is prepared from o-chloro-p-methoxyaniline (Hodgson and Handley: J. Chem. Soc. 1926, 543) by diazotization and coupling of the resulting diazo compound with potassium ethylxanthate by analogy with the preparation of o:p-dichlorothiophenol from o:p-dichloroaniline by the method of Jonsson, Nilsson and Burström: Act. Chem. Scand. 6, 993 (1952).

Example VIII

A suspension of 20.7 g. of o-chloro-p-methylsulphonylphenol, 13.8 g. of potassium carbonate and 0.5 g. of copper powder in 250 cc. of methyl ethyl ketone is heated to a temperature of from 55 to 60° C. 19 g. of O.O-diethyl phosphorochloridothionate are added over a period of about five minutes, and the temperature then maintained at about 50° C. for 3 hours. After standing overnight, the salt is filtered off and the liquid is concentrated at a temperature of from 50 to 60° C. under a pressure of from 20 to 30 mm. of mercury. The residual oil is taken up in 150 cc. of benzene and washed three times with 100 cc. of water. After drying the washed solution over potassium carbonate, the benzene is driven off and there remains an oil weighing 32 g. analysis of which shows that it is O.O-diethyl O-o-chloro-p-methylsulphonylphenylphosphorothionate.

The o-chloro-p-methylsulphonylphenol, which melts at 169° C. (Kofler) is prepared by the action of hydrobromic acid on o-chloro-p-methylsulphonylanisole, as indicated in Example VII.

The o-chloro-p-methylsulphonylanisole, which melts at 112° C. (Kofler) is itself prepared by methylation of m-chloro-p-methoxybenzenesulphinic acid (M. P. 110° C.) with methyl sulphate by a known method. The m-chloro-p-methoxybenzenesulphinic acid is itself prepared by the reduction with sodium sulphite of m-chloro-p-methoxybenzenesulphonyl chloride (Child: J. Chem. Soc. 1932, 715).

Example IX 20.7 g. of m-chloro-p-methylsulphonylphenol and 0.5 g. copper powder are added all at once to a suspension of 13.8 g. of potassium carbonate in 150 cc. of methyl ethyl ketone. 16.1 g. of O.O-dimethylphosphorochloridothionate is then added drop by drop over a period of about ten minutes and the mixture is shaken for 5 hours at room temperature. After standing overnight, the reaction mixture is heated at 40–50° C. for 3 hours. It is then filtered to remove the salt present and the filtrate is concentrated by heating at 40–50° C. under a pressure of 20 to 30 mm. of mercury. The residue of O.O-dimethyl O-m-chloro-p-methylsulphonylphenylphosphorothionate weighing 32 g. crystallizes on cooling.

Example X 23.4 g. of p-phenylsulphonylphenol and 0.5 g. of copper powder are added all at once to a suspension of 13.8 g. of potassium carbonate in 150 cc. of methyl ethyl ketone. 18.9 g. of O.O-diethylphosphorochloridothionate is then added over a period of about ten minutes. The mixture is shaken at room temperature for 3 hours, and then refluxed for 2 hours. After cooling and separation of the salt present the solution is concentrated by heating at 40–50° C. under a pressure of 20 to 30 mm. of mercury. A viscous residue is obtained weighing 32 g., analysis of which shows that it is O.O-diethyl O-p-phenylsulphonylphenylphosphorothionate.

The p-phenylsulphonylphenol employed as starting material is prepared according to the method of Ullman: Ber. 34, 1153 (1901).

Example XI 18.6 g. of o-methyl-p-methylsulphonylphenol and 0.5 g. of copper powder are added all at once to a suspension of 13.8 g. of potassium carbonate in 150 cc. of methyl ethyl ketone. 18.9 g. of O.O-diethylphosphorochloridothionate is then run in over a period of five minutes. After shaking for two hours at room temperature, the mixture is heated to 60° C. for 1 hour. After cooling, the salts are filtered off and the solution is concentrated by heating at 50–60° C. under a pressure of 20 to 30 mm. of mercury. An oily residue remains weighing 28 g., analysis of which shows that it is O.O-diethyl O-o-methyl-p-methylsulphonylphenylphosphorothionate.

o-Methyl-p-methylsulphonylphenol, which melts at 122° C. is prepared by demethylation of o-methyl-p-methylsulphonylanisole using hydrobromic acid by analogy with the preparation of 4-hydroxyphenylmethylsulphone (Burdwell and Cooper: J. A. C. S. 74, 1058 (1952)). o-Methyl-p-methylsulphonylanisole (M. P. 64–65° C.) is prepared by methylation using methyl sulphate of m-methyl-p-methoxybenzenesulphinic acid (M. P. 69–70° C.), itself obtained by the reduction with sodium sulphite of m-methyl-p-methoxybenzenesulphonylchloride (Child: J. Chem. Soc. 1932, 715–720).

Example XII 1 g. of O.O-diethyl O-p-methylsulphonylphenylphosphorothionate is dissolved in 5 cc. of acetone, and then 2 cc. of toluene and 1.5 g. of a non-ionic emulsifying agent are added. After shaking, the volume is made up to 10 cc. by addition of acetone. A 10% solution of O.O-diethyl O-p-methylsulphonylphenylphosphorothionate is thus obtained. This solution can be changed into an emulsion by the addition of water. For example, to obtain an emulsion containing 0.05% of the phosphorothionate, 1 cc. of the 10% solution is shaken with 200 cc. of water.

By operating in the same way but replacing the acetone by dimethylformamide, a solution of O.O-diethyl-O-p-methylsulphonylphenylphosphorothionate is obtained, which also can be changed into an aqueous emulsion.

Example XIII

A mixture of 2 parts by weight of O.O-dimethyl O-p-methylsulphonylphenylphosphorothionate and 98 parts by weight of kieselguhr is intimately crushed until a powder is obtained in which the active substance is uniformly distributed. The powder thus prepared may be used as such against red spiders.

Example XIV

A self-emulsifiable concentrate is prepared, containing:

|   | G. |
|---|---|
| O.O-diethyl O-m-chloro-p-methylsulphonylphenylphosphorothionate | 10 |
| Acetone | 25 |
| Emulsifying agent (condensate of 10 mols of ethylene oxide and 1 mol. of octylphenol) | 10 |
| Dimethylacetonylcarbinol, quantity sufficient to give total volume of 50 cc. | |

For use, this concentrate is diluted with water to give a concentration of from 5 to 100 g. of active substance per hectolitre.

Example XV

A concentrate is prepared, containing:

|   | G. |
|---|---|
| O.O-diisopropyl O-p-methylsulphonylphenylphosphorothionate | 10 |
| Xylene | 25 |
| Emulsifying agent (fatty acid ester of mixed anhydrosorbitols solubilised by etherifying the free hydroxyl groups with ethylene oxide) | 10 |
| Dimethylacetonylcarbinol, quantity sufficient to give a total volume of 50 cc. | |

This concentrate is used in the same manner as in Example XIV.

Example XVI 5 parts by weight of O.O-dimethyl O-p-chloromethylsulphonylphenylphosphorothionate are dissolved in 25 parts by weight of acetone, and 95 parts by weight of talc are impregnated with the solution thus obtained. The powder thus obtained may be used as such or may be brought into suspension in water.

Example XVII

A mixture of 2 parts by weight of O.O-diethyl O-p-methylsulphonylphenylphosphorothionate, 3 parts by weight of emulsifying agent and 95 parts of talc is intimately ground until a powder is obtained in which the phosphorothionate is uniformly distributed. The powder may be used as such or may be brought into suspension in water.

The procedures of each one of Examples XII to XVII may be applied to the preparation of an insecticidal composition using a phosphorus derivative produced as in any one of Examples I to XI in place of the particular phosphorus derivative referred to therein.

Example XVIII

Two aqueous emulsions are prepared from the product of Example II containing respectively 100 milligrams per litre and 50 milligrams per litre of said product. Two further aqueous emulsions of the same concentrations are prepared from the product of Example VII. Discs of bean leaves contaminated with red spiders (*Tetranychus telarius*) are immersed for 10 seconds in the aqueous emulsions. The leaf discs are dried and then stuck, by means of gum arabic, on to glass plates. All mobile forms of the red spiders (larvae in all stages and adults) are killed with a glass needle. The intact eggs are counted and each disc is surrounded by a ring of petroleum jelly.

The plates are kept in a room at a constant humidity and temperature, and after 10 days the percentage of eclosion is determined by comparing the number of larvae caught in the petroleum jelly with the initial number of eggs.

The products of Examples II and VII both give the following results:

Emulsions of concentration 100 milligrams/litre: mortality of the eggs is 100%
Emulsions of concentration 50 milligrams/litre: mortality of the eggs is 90%

Example XIX

A set of solutions of concentrations 100 and 200 milligrams per litre is prepared from each of the products of Examples III, IV, V and VII, i. e. 8 solutions in all.

Whole beanstalks planted in earthenware pots and having their two coteledonary leaves and the first true leaf fully developed, are contaminated with *Tetranychus telarius*, placed on a turntable and sprayed with the solutions using a metal atomizer. Every two days, a number of leaves is removed and the number of dead adult acaridae and larvae on the limb of the leaf is counted. The percentage of mortality is thus obtained.

The corrected percentages of mortality obtained with the solutions of 100 and 200 milligrams per litre concentration are given in the following table:

| Product of Example No. | (Milligrams per litre) | Mortality, Percent | | | | | |
|---|---|---|---|---|---|---|---|
| | | Third day | | | Seventh day | | |
| | | A | $L_8$ | $L_6$ | A | $L_8$ | $L_6$ |
| III | 100 | 10 | 50 | 50 | 20 | 20 | 20 |
| | 200 | 70 | 80 | 30 | 40 | 50 | 20 |
| IV | 100 | 80 | 80 | 50 | 90 | 80 | 30 |
| | 200 | 80 | 80 | 60 | 95 | 100 | 50 |
| V | 100 | 100 | 100 | 100 | 100 | 100 | 80 |
| | 200 | 100 | 100 | 100 | 100 | 100 | 95 |
| VII | 100 | 100 | 100 | 100 | 100 | 100 | 90 |
| | 200 | 100 | 100 | 100 | 100 | 100 | 100 |

A=Adults; $L_8$=larvae in all stages having 8 legs; $L_6$=larvae in the first stage having 6 legs.

I claim:

1. A phosphorus derivative of the general formula:

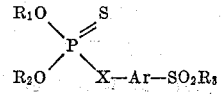

in which X represents one of the group consisting of oxygen and sulphur, Ar represents a member of the class consisting of phenylene, chlorophenylene and methylphenylene groups, $R_1$ and $R_2$ are each an alkyl group containing 1 to 4 carbon atoms, and $R_3$ represents a member of the class consisting of alkyl and chloroalkyl groups containing from 1 to 4 carbon atoms and the phenyl group.

2. O.O-dimethyl O-p-methylsulphonylphenylphosphorothionate.
3. O.O-diisopropyl O-p-methylsulphonylphenylphosphorothionate.
4. O.O-diethyl O-p-chloromethylsulphonylphenylphosphorothionate.
5. O.O-dimethyl O-p-chloromethylsulphonylphenylphosphorothionate.
6. O.O-diethyl O-m-chloro-p-methylsulphonylphenylphosphorothionate.

7. A process for the preparation of a phosphorus derivative which comprises reacting a phosphorochloridothionate of the general formula:

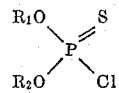

with a phenol or thiophenol of the general formula HX—Ar—$SO_2R_3$, in which X represents one of the group consisting of oxygen and sulphur, Ar represents a member of the class consisting of phenylene, chlorophenylene and methylphenylene groups, $R_1$ and $R_2$ are each an alkyl group containing 1 to 4 carbon atoms, and $R_3$ represents a member of the class consisting of alkyl and chloroalkyl groups containing from 1 to 4 carbon atoms and the phenyl group.

8. A process according to claim 7 in which the reaction is effected in an organic solvent medium at a temperature below 150° C. in the presence of an alkaline condensing agent.

9. An insecticidal composition which comprises a phosphorus derivative of the general formula:

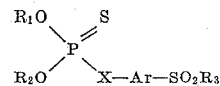

in which X represents one of the group consisting of oxygen and sulphur, Ar represents a member of the class consisting of phenylene, chlorophenylene and methyl phenylene groups, $R_1$ and $R_2$ are each an alkyl group containing 1 to 4 carbon atoms, and $R_3$ represents a member of the class consisting of alkyl and chloroalkyl groups containing from 1 to 4 carbon atoms and the phenyl group and at least one diluent compatible therewith.

10. An insecticidal composition which comprises a phosphorus derivative of the general formula:

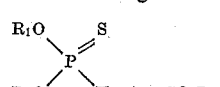

in which X represents one of the group consisting of oxygen and sulphur, Ar represents a member of the class consisting of phenylene, chlorphenylene and methylphenylene groups, $R_1$ and $R_2$ are each an alkyl group containing 1 to 4 carbon atoms, and $R_3$ represents a member of the class consisting of alkyl and chloroalkyl groups containing from 1 to 4 carbon atoms and the phenyl group and at least one powder diluent compatible therewith.

11. An insecticidal composition which comprises a phosphorus derivative of the general formula:

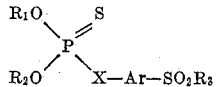

in which X represents one of the group consisting of oxygen and sulphur, Ar represents a member of the class consisting of phenylene, chlorophenylene and methylphenylene groups, $R_1$ and $R_2$ are each an alkyl group containing 1 to 4 carbon atoms, and $R_3$ represents a member of the class consisting of alkyl and chloroalkyl groups containing from 1 to 4 carbon atoms and the phenyl group and at least one diluent compatible therewith, the said phosphorus derivative being present in an amount of 0.005 to 5% based on the weight of the composition.

12. An insecticidal composition which comprises a phosphorus derivative of the general formula:

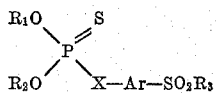

in which X represents one of the group consisting of oxygen and sulphur, Ar represents a member of the class consisting of phenylene, chlorophenylene and methylphenylene groups, $R_1$ and $R_2$ are each an alkyl group containing 1 to 4 carbon atoms, and $R_3$ represents a member of the class consisting of alkyl and chloroalkyl groups containing from 1 to 4 carbon atoms and the phenyl group, the said phosphorus derivative being contained in a liquid diluent and being present in a proportion of 0.005 to 0.1% based on the weight of the composition.

References Cited in the file of this patent
FOREIGN PATENTS 876,692    Germany _____ May 18, 1953